INVENTOR.
WILLIAM K. RALSTON
BY
ATT'Y.

United States Patent Office 3,450,029
Patented June 17, 1969

3,450,029
SELF-STRIPPING WIRE TWISTER FOR WIRE BALERS
William K. Ralston, Memphis, Tenn., assignor to International Harvester Company, Chicago, Ill., a corporation of Delaware
Filed Mar. 13, 1967, Ser. No. 622,514
Int. Cl. B65b 13/28, 13/08
U.S. Cl. 100—22                                    4 Claims

ABSTRACT OF THE DISCLOSURE

A wire twister for binding bales of hay in a hay baler and having a twister hook oriented in its home position towards the direction of bale movement so that the intertwisted ends of a strand of wire encircling a bale is dislodged from the twister hook by rearward movement of the bale.

Background of the invention

This invention relates generally to wire twisters for joining opposite ends of a strand of wire encircling a bale of hay formed in a hay baler. More specifically, the wire twister disclosed herein belongs to a particular type which employs a twister hook and a rotary wire holder.

In the presently known wire twisters of the type described herein, the twister hook except for modifications developed concurrently herewith is positioned in a direction transverse to that of bale movement through the baling chamber. Therefore, in order to dislodge the wire twist from the twister hook, a stripper finger moving in the direction of orientation of the hook is used to force the wire twist past the end of the hook. The use of a stripper finger as a means for stripping the wire from the hook is undesirable because it increases the complexity of the twisting mechanism. For example, the stripper finger must be actuated at precisely the right moment in the sequence of twisting operations. This requires modification of the other components of the mechanism in order that the stripper be synchronized therewith. Furthermore, the stripper finger must be precisely adjusted to travel just the right distance to dislodge the twisted wire from the hook.

The general purpose of the present invention is to provide a twister mechanism having a twister hook oriented in the direction of bale movement so that the intertwisted ends are dislodged from the hook solely by movement of the bale.

Twine balers presently employ knotter mechanisms wherein the stripping is effected through orientation of a knotter hook (see Patent No. 3,101,963 issued to H. D. Sullivan et al., August 27, 1963). In spite of the long success of the self-stripping twine knotters, attempts to employ the same feature in wire balers proved generally unsuccessful. The wire as a binding medium did not lend itself to self-stripping by the structure used in twine knotters because of its inherent characteristics. With reference to the previously mentioned patent, it will be observed that the home position of the twine knotter hook 22 (FIGURE 9) is transverse to the bale movement. The home position shown therein permits the twine to be laid across the hook and still permits stripping by rearward movement of the bale. Such a home position for a wire twister hook is wholly impractical because the wire would quickly wear grooves in the hook.

Summary of the invention

The present invention contemplates the use of a wire twister hook in a twister mechanism wherein stripping of the intertwisted ends of wires encircling a formed bale is aided by the orientation of the twister hook. The twister hook is adapted to the twister mechanism so that its home position is in general alignment with the direction of bale movement.

Description of the preferred embodiment

The wire twister will be described in connection with a conventional hay baler of the type shown in U.S. Patent No. 2,403,396 issued to R. R. Raney, July 2, 1946, but it is understood that the invention may be applied to any hay balers which employ wire twisters as a means for binding bales of hay. In a conventional mobile baler, hay is compacted in a bale chamber by a reciprocating plunger, and the direction of bale movement is rearwardly within the confines of the bale chamber.

Figure 1:
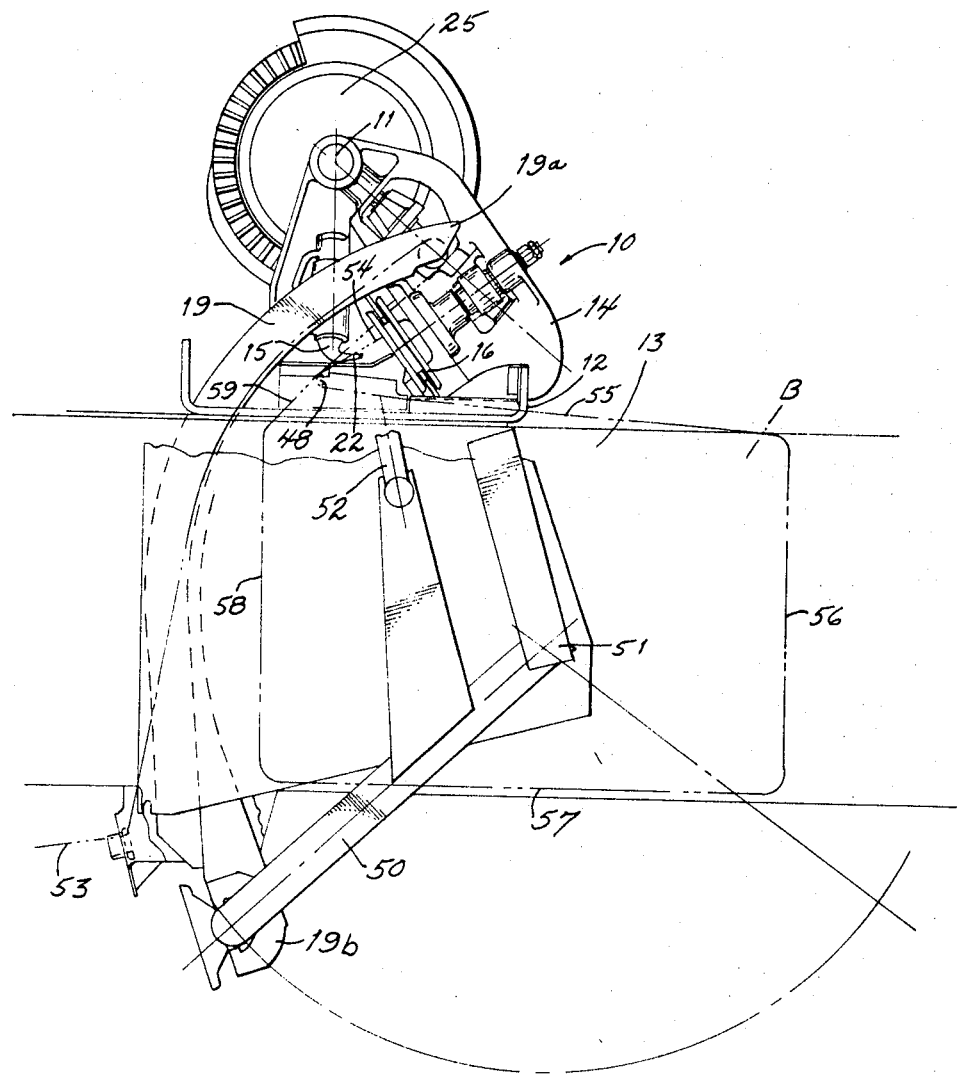
FIGURE 1 is a side elevational view showing the twister mechanism mounted on a baler.
Figure 2:
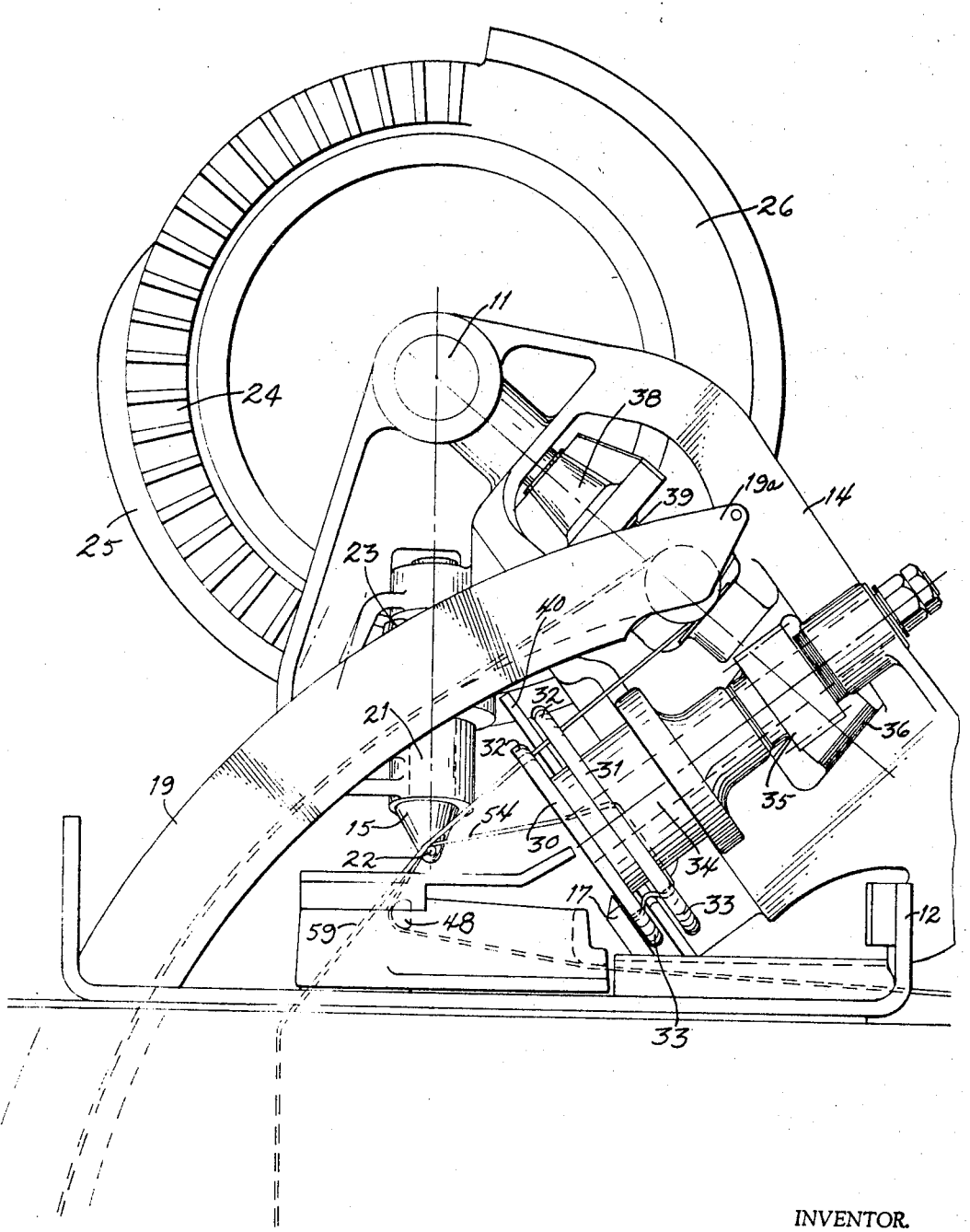
FIGURE 2 is an enlarged and detailed view of the twister mechanism shown in FIGURE 1.

As shown in FIGURES 1 and 2 the twister mechanism 10 mounted on drive shaft 11 is disposed above a breastplate 12 covering a bale chamber 13. The components of the twister mechanism 10 are carried by a frame 14 and include generally a twister element 15, a rotary wire holder 16 and wire shear 17. The components of the twister 10 are cooperatively arranged with a wire-carrying needle 19 and operate in timed relation therewith to bind hay compacted in the bale chamber 13 into a bale.

The twister element 15 comprises shaft 21 rotatably mounted in frame 14 and a hook 22 projecting laterally from shaft 21. Shaft 21 carries at its upper end a bevel gear 23 aligned to intermesh with a segmental gear 24 formed on disk 25 which is keyed to shaft 11. The length of segmental gear 24 determines the number of twisting revolutions and a smooth section 26 formed on the disc 25 and engageable with a flat portion on bevel gear 23 determines the home position of the twister element 15. Heretofore the home position was set with the hook 22 projecting transversely with respect to bale movement so that the hook 22 was in position to receive the wire ends preliminary to twisting operations. In the present invention the home position of the twister element 15 as best seen in FIGURE 3 is such that the hook 22 extends generally in the direction of bale movement.

The wire holder 16 is conventional, comprising a pair of spaced-apart disks 30 and 31 having diametrical aligned notches 32 and 33. The discs 30 and 31 are actuated by disc 25 through a gear train comprising a shaft 34, a bevel gear 35, a helical gear 36, a shaft 39 and a bevel gear 38 aligned to intermesh with a segmental gear (not shown) formed in disc 25. A keeper blade 40 spaced between the twin disks 30 and 31 serves to grasp and hold wire therebetween. A shear knife 17 mounted on frame 14 has a shearing edge disposed in alignment with notch 33 of disk 30 so that as disk 30 is rotated past the shearing edge, wire grasped by the holder 16 is sheared thereby.

Figure 3:
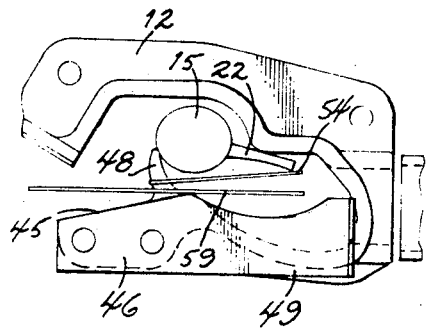
FIGURE 3 is a simplified plan view illustrating the disposition of the twister hook in its home position relative to the strand ends.
Figure 4:
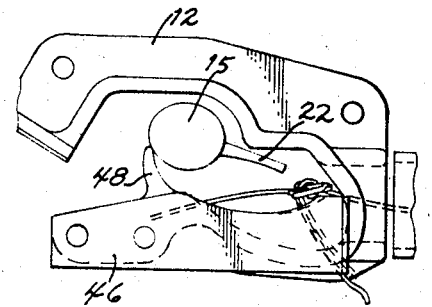
FIGURE 4 is a view similar to FIGURE 3 showing the intertwisted ends being dislodged from the hook.
Figure 5:
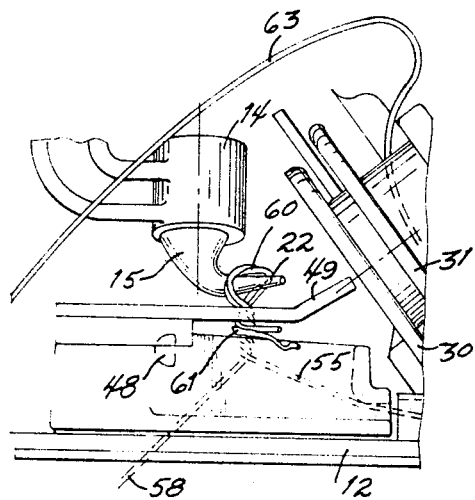
FIGURE 5 is a simplified side view showing the relationship of the various components of the twister mechanism when in the home position.

Now referring to FIGURES 3 and 5, the breastplate 12 has formed therein a slot 45 through which passes the needle 19. A breastplate insert 46 is attached to the breastplate 12 along side slot 45. The insert 46 has a finger 48 extending across slot 45 at a point rearward of the needle passage, and serves to block the path of wire delivered by the needle 19.

As best seen in FIGURE 1, the needle 19 is of arcuate configuration having a forward wire carrying end 19a and a rearward end 19b secured to a needle tie pipe 50. The tie pipe 50 is pivotally mounted on both sides of the bale chamber 13 as denoted by reference numeral 51, and is drivingly connected to shaft 11 by a pitman and crank arrangement (a portion 52 of the pitman being shown in FIGURE 1). The needle 19, twister element 15, and holder 16 are operated in timed relation in the manner described in U.S. Patent No. 2,513,967 issued to R. R. Raney et al.

The needle 19 pivotable about point 51 delivers wire 53 from a position removed from the bale chamber 13 to the wire twister 10 in a predetermined path. During formation of a bale B in the bale chamber 13 by the reciprocating plunger (not shown), the wire 53 extends around three sides of the bale B as follows: A first portion 54 extends from the holder 16 around finger 48, a second portion 55 extends across the top side of bale B, a third portion 56 extends across the rearwardly disposed end of bale B, and a fourth portion 57 extends across the bottom side of bale B and terminates in end 19a of needle 19.

Upon completion of the bale B in bale chamber 13, the needle 19 is moved from a position removed from the bale chamber to the position shown in FIGURE 1. As the needle crosses the bale chamber 13 a wire portion 58 is laid across the front end of bale B and another portion 59 extending across finger 48 is laid in disc notches 32 of the holder 16. As shown in FIGURE 3 the portion 59 lies across finger 48 in a side-by-side relation with portion 54. It should be noted that portion 59 is not laid across hook 22 but is laterally displaced therefrom. The fact that portion 59 need not be laid across hook 22 permits the hook to be oriented in a more rearwardly direction which favors the self stripping operation to be discussed presently.

In operation let it be assumed that the strand-carrying needle 19 has delivered portions 58 and 59 in their respective positions as shown in FIGURE 1. Portion 59 is laid side-by-side to portion 54 on finger 48 and is gripped by holder 16. Twister element 15 rotates hook 22 in an orbit which intersects the locus of portions 54, 59, the direction of rotation being clockwise as viewed in FIGURE 3. As best seen in FIGURE 2 the hook 22 lifts portions 54 and 59 from finger 48. At the proper point in the sequence of operation holder 16 shears portion 59 and releases portion 54 while the twister element 15 continues rotating a predetermined number of revolutions. Rotation of hook 22 forms a loop 60 in portions 54 and 59 and an intertwisted portion 61 at the base of loop 60. At the end of the twisting cycle, twister element 15 returns to the home position wherein hook 22 points in a generally rearward direction (the direction of bale movement) and has lodged thereon loop 60.

Figure 6:
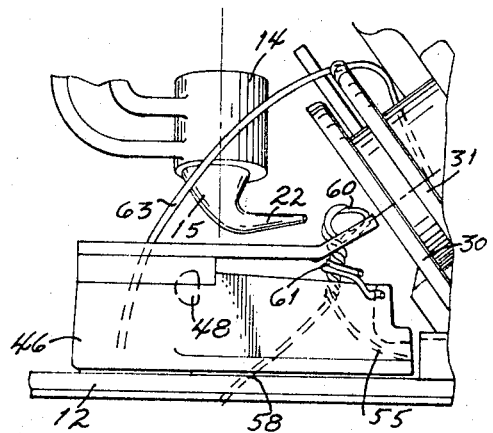
FIGURE 6 is a view similar to FIGURE 5 showing the intertwisted ends being stripped from the hook.

Meanwhile needle 19 has returned to the position removed from the bale chamber placing another portion 63 (FIGURES 5 and 6) of wire 53 in position for receiving a subsequent bale. The jarring action of the reciprocable plunger in the formation of the subsequent bale moves bale B rearwardly and tends to jar loop 60 off the hook 22. Because of the rigidity of wire 53 the jarring action greatly aids in the stripping of the loop 60 as bale B moves rearwardly.

What is claimed is:

1. In a baler of the type having a bale chamber which defines the direction of bale movement, a wire twister mechanism for joining the ends of a strand of wire encircling a bale formed in the bale chamber, said twisting mechanism comprising a wire-carrying needle operable to deliver a strand of wire through said bale chamber in a predetermined path;

a finger disposed in said path for blocking the movement of said strand of wire delivered by said needle;

a rotary wire holder spacially removed from said finger along said path and aligned therewith for receiving and gripping said strand of wire delivered by said needle;

a rotatable twister element having a shank and a hook projecting laterally from said shank, said hook being rotatable in an orbit which intersects said path at a point interposed between said finger and said holder, and means for operating said needle and rotating said wire holder and said hook in timed relation to effect the intertwisting of said ends to form a loop on said hook, said twister element having a home position wherein said hook projects generally in the direction of bale movement and in which position the loop is adapted to be stripped off of the hook solely by the next succeeding bale butting against the bale being instantly tied.

2. In the invention according to Claim 1 wherein the hook projects generally in a straight line, the projection being substantially horizontal when said twister element is in its home position to facilitate stripping of said loop from said hook.

3. A twister mechanism for a baler having a bale chamber defining the direction of bale movement, said twister mechanism adapated for joining the ends of a strand of wire encircling a bale formed in the bale chamber, said mechanism comprising:

a rotary wire holder mounted adjacent to a side of a bale being formed in said chamber for gripping a first end of said strand encircling said bale;

a finger disposed transversely to the direction of travel of said bale and providing a surface across which the strand is received between said first end and the side of the bale;

a needle operable to deliver a second end of said strand through said bale chamber across said finger for gripping by said holder;

a rotatable twister element having a shank and a hook projecting laterally from said shank, said hook being rotatable in an orbit interposed between said finger and said holder; and means for operating said needle and rotating said holder and said hook in timed relation to intertwist said ends of said strand in a loop formed on said hook, said twister element having a home position wherein said hook projects generally in the direction of bale movement and in which position the loop is adapted to be stripped off the hook solely by the next succeeding bale butting against the bale being instantly tied.

4. The subject matter of claim 3, wherein said hook extends from said shank in generally a straight line facilitating the stripping of said loop therefrom.

References Cited

UNITED STATES PATENTS

| 2,403,396 | 7/1946 | Raney | 100—21 |
| 2,513,967 | 7/1950 | Raney et al. | 100—20 |
| 2,953,082 | 9/1960 | Eberly | 100—21 |
| 2,988,115 | 6/1961 | Cheatum | 100—21 X |
| 3,082,798 | 3/1963 | Cheatum et al. | 100—21 X |
| 3,101,963 | 8/1963 | Sullivan et al. | 289—11 |

FOREIGN PATENTS 314,460  9/1919  Germany.

BILLY J. WILHITE, *Primary Examiner.*

U.S. Cl. X.R.

100—31